April 11, 1944.   W. L. LYON ET AL   2,346,223
SELF-CLOSING VALVE FOR SINGLE DIRECTIONAL FLUID FLOW
Filed June 9, 1942
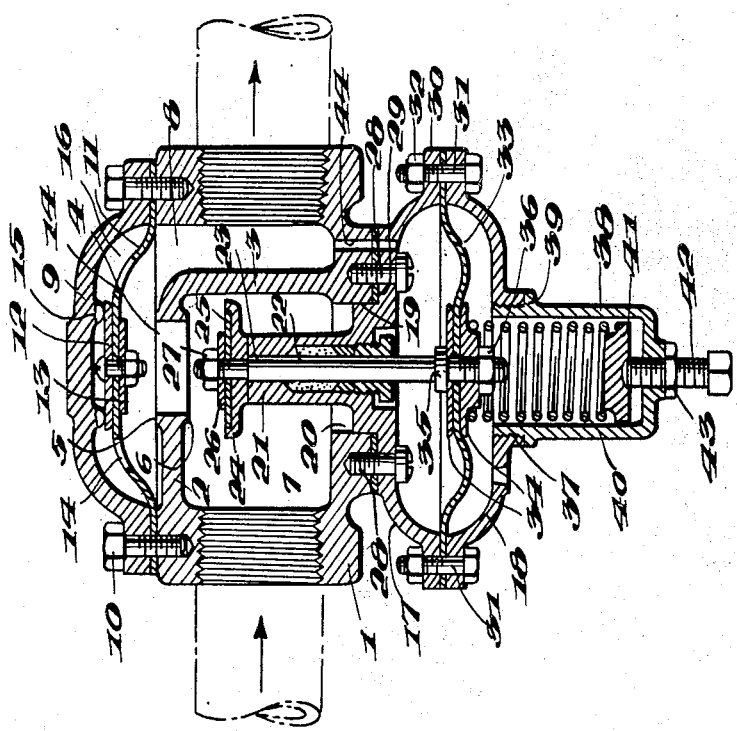
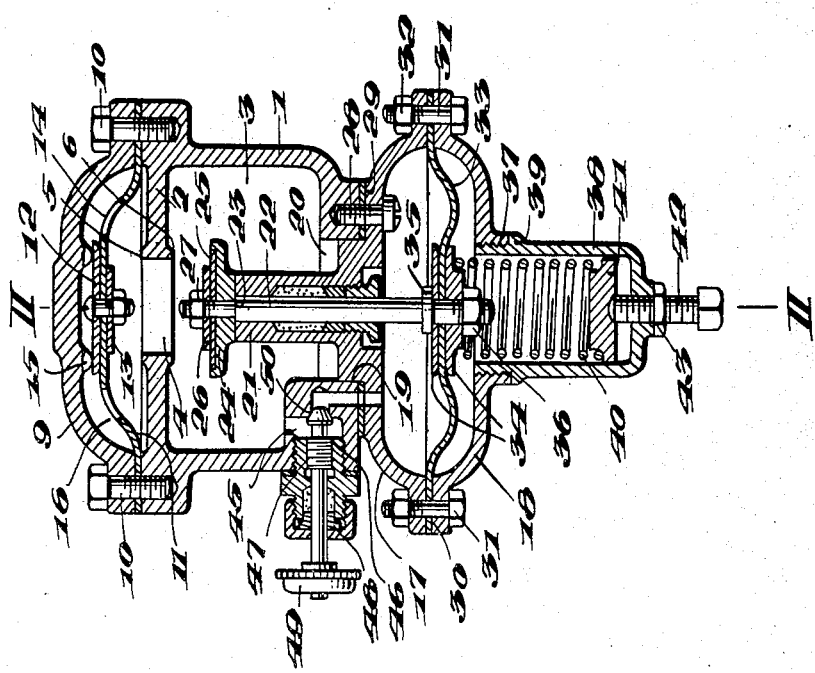
Inventors
Milton E. Lake,
William Lewis Lyon,
By
Attorney Patented Apr. 11, 1944

2,346,223

UNITED STATES PATENT OFFICE 2,346,223

SELF-CLOSING VALVE FOR SINGLE DIRECTIONAL FLUID FLOW

William Lewis Lyon and Milton E. Lake, South Norwalk, Conn.

Application June 9, 1942, Serial No. 446,392

2 Claims. (Cl. 137—153)

This invention relates to improvements in automatic shut-off valves, and has for a principal object the provision of a valve for arresting automatically the flow of fluids (gases, vapors or liquids) in confined pipe lines when a reversal in the normal direction of fluid flow is created or when an unusual flow condition in a normal direction takes place.

The ordinary check valve operates to arrest a reversal of fluid flow through a confining pipe system, but does not prevent excessive or unusual flow in a normal direction, and therefore will not act to cause a stoppage of flow in such normal direction when a predetermined pressure, or a certain definite lowering of pressure within the outlet line associated with the valve is established.

One of the primary objects of this invention is to provide a control or shut-off valve which will stop fluid flow in associated gas or liquid carrying lines immediately when a reversal of flow occurs, or when a predetermined pressure drop occurs, particularly such reductions in pressure that are attributable to partial or complete breaks in an associated pipe line system either on the up or downstream sides of the valve.

Another object is to provide a safety shut-off valve which may be installed at certain designated locations in a fluid piping system for the purpose of protecting other sections of the system when abnormal conditions of fluid flow exist.

It is a further object to provide a control valve of the character set forth which will close automatically to arrest fluid flow upon the presence of abnormal conditions and when once closed will require a definite manual operation to again place the same in service.

For a further understanding of the invention, reference is to be had to the following description and the accompanying drawing, wherein:

Fig. 1 is a vertical sectional view taken through the safety control valve forming the present invention;

Fig. 2 is a similar view on the plane indicated by the line II—II of Fig. 1.

Referring more particularly to the drawing, the safety control valve comprises a casing 1. Within the casing, there is formed a divisional wall having a horizontally extending web 2 and a vertical web 3. The horizontal web is provided with a fluid passage or opening 4, the opposite ends of which terminate in upper and lower valve seats 5 and 6 respectively. For convenience in description, it will be assumed that the valve is installed in the horizontal position, as shown, in connection with an associated pipe line system, with the normal direction of fluid flow through the valve as indicated by the arrows.

The partition wall divides the valve casing internally into a fluid inlet chamber 7 and an outlet chamber 8, the said chambers communicating relatively through the opening 4. Forming a component part of the casing and arranged on the top thereof is a separable cap plate 9, the latter being marginally flanged and provided with spaced openings for the reception of cap screws or bolts 10, the threaded shanks of the latter being received within tapped openings or sockets provided in the body 1 of the casing. Between the adjoining surfaces of the cap plate and the casing body, there is securely clamped the marginal portions of an upper flexible diaphragm 11. The center of this diaphragm has secured thereto upper and lower valve disks 12 and 13 respectively. Also, said diaphragm between the outer peripheral edges of the disks 12 and 13 and its clamped outer edges is formed with a plurality of perforations 14.

When normal fluid flow in the direction of the arrow shown in Fig. 1 obtains, fluid pressure exerted on the under side of the diaphragm causes the later to flex upwardly so that the upper disk 12 engages with stop lugs 15 protruding from the under side of the cap plate 9, thus spacing the lower disk valve 13 from the upper valve seat 5 and enabling fluid to flow without restriction from the inlet to the outlet chambers of the valve casing. The cap plate, as a result of its cross sectional configuration, provides an upper diaphragm chamber 16, which is in open communication with the outlet chamber and may be considered as a part or continuation of the outlet chamber. The valve disk 13 thus seats by the force of gravity on the seat 5.

The perforations 14 in the diaphragm permit almost equalized fluid pressures to obtain above and below the diaphragm. When no flow exists through the valve in a normal direction, the disk 13 will rest on the valve seat 5, thereby closing the opening 4. When a flow condition is created, however, in a normal direction, the pressure on the outlet side of the valve and in the diaphragm chamber above the valve disk is lessened. This lowering of pressure established by a normal condition of fluid flow creates a difference in pressure above and below the diaphragm, and this pressure differential comprises the operating force for flexing the diaphragm and lifting the valve disk 13 from the seat 5, permitting a normal flow condition to be established through the upper portion of the valve.

It will be seen that the valve disk 13 will come to rest on the seat 5 by the action of gravity when the inlet and outlet pressure on the valve is substantially the same. Should, however, the outlet pressure be equal to, or exceed, the inlet pressure, a reversal in the direction of flow of the fluid from the outlet to the inlet side of the valve can not occur, since the valve disk 13 will occupy its seated position closing the opening 4. When the outlet pressure exceeds the inlet pressure, the disk 13 will be tightly held in engagement with its seat. Any increase in pressure on the outlet side of the valve will cause the disk 13 to seat with greater force.

This upper diaphragm assembly, therefore, serves to effect automatic closure of the valve in the event of abnormally high pressure on its outlet side, or in the event there should be a reversal in the normal direction of flow of fluid through the valve. It is also important to provide for the closure of the valve or the stoppage of fluid flow therethrough in the event the fluid pressure falls below a predetermined level to prevent unnecessary or dangerous escape of the fluid if there should be a breakage in the associated pipe line system either on the up or down stream side of the valve.

This latter function is accomplished by a lower diaphragm and valve assembly, comprising a supplemental casing composed of separable upper and lower sections 17 and 18 respectively. The upper section 17 is formed axially with an annular shoulder 19 which is adapted to be snugly received within an opening 20 provided in the bottom wall of the main casing body 1. Projecting upwardly from the shoulder portion 19 is a tubular extension 21, the latter being axially registered with the opening 4. Slidably received within an axial bore provided in the extension 21 is a valve rod 22, the upper end of which is shouldered as at 23 for the reception of a lower valve member 24. The upper surface of the member 24 carries as a component part thereof a disk 25 of a compressible material, which is held in place by a washer 26. A clamping nut 27 is threaded on the upper end of the valve rod 22 thereby clamping the valve member 24 on and around the shouldered portion 23 of the valve rod.

A casing section 17 is provided with openings through which extend headed screws 28, the threaded shanks of the latter being received within tapped openings formed in the casing 1, a gasket 29 of compressible material being arranged between the adjoining surfaces of the body 1 and the casing section 17. The sections 17 and 18 have their outer portions flanged as at 30 and formed with aligned openings for the reception of clamping bolts 31, the threaded upper ends of the latter being provided with binding nuts 32. Between the flanged portions 30 of said casing sections, there is securely clamped the outer peripheral portion of a lower diaphragm 33. The central region of the diaphragm carries spaced washer plates 34. These plates are formed with registering axial openings for the reception of the lower end of the valve rod 22, a collar 35 formed on said valve rod being disposed in engagement with the upper of the plates 34, while a nut 36 is threaded on the lower end of the valve rod for clamping engagement with the lower of the plates 34.

The lower casing section 18 is centrally threaded and provided with a depending boss 37 for the reception of the threaded upper end of a spring-receiving cup 38, the outer portion of the cup being formed with an annular flange 39 for seating engagement with the boss 37. Within the cup 38, there is mounted a coil spring 40, the upper end of this spring having seated engagement with the lower of the plates 34, while the lower end of the spring rests upon an adjustable disk 41. This disk may be raised or lowered in the cup to control spring tension by means of a bolt 42 threaded in the lower end of the cup 38 and provided with a lock nut 43.

Normally, the tendency of the spring 40 is to flex the diaphragm 33 so that the valve rod 22 will be advanced to cause the valve member 24 to engage with the lower seat 6 of the valve opening 4. This action, however, is normally counteracted by the provision of a pressure equalizing passage 44. This restricted passage extends from the outlet chamber 8 of the valve into the upper half of the lower diaphragm chamber provided in the casing sections 17 and 18, so that the pressure of the fluid passing through the valve will be sufficient to flex the diaphragm 33 downwardly and cause the valve member 24 to seat on the upper end of the casing extension 21, thus holding the valve member 24 in spaced relation from the opening 4.

It will be seen that if the pressure in the outlet chamber should be reduced below normal limits, as by the breakage of an associated pipe line, the decrease in fluid pressure in the lower diaphragm chamber, will enable the diaphragm 33 to respond to the force of the spring 40 and effect seating of the valve member 24 on the seat 6, thus automatically arresting further fluid flow through the valve proper. The tension of the spring 40 may be adjusted conveniently to obtain the desired response of the diaphragm 33 to appropriate pressure ranges.

When the valve closes automatically, either by a build-up in pressure on its outlet side, or by reason of an abnormally low pressure, the valve will remain closed until it is manually reset for continued automatic operation. Such resetting is accomplished by the provision of a passageway 45 formed in the casing 1 and the casing section 17. The passageway 45 is several times greater in diameter than the passage 44. Usually, fluid flow through the passageway 45 is obstructed by a manually operated valve 46, the threaded stem 47 of which projects horizontally through a packed gland 48 carried by and extending from the side of the casing 1, the outer end of the stem 47 being equipped with a hand wheel or knob 49. However, the valve 46 normally engages with a seat 50.

By this construction, it will be seen that whenever fluid flow through the main valve is arrested for the reasons above given, operation of the valve may be restored by opening the passageway 45 through proper manipulation of the valve 46. Since the passageway 45 possesses a greater diameter than the passage 44, a fluid pressure will be established in the upper part of the diaphragm chamber in the supplemental casing, since the fluid will enter the diaphragm chamber faster than it will be expelled through the passage 44. The pressure thus created within the diaphragm chamber will flex the diaphragm 33, causing the valve member 24 to uncover the opening 4.

The present invention provides a two-way safety shut-off valve which may be usefully employed in many fluid-transmitting systems for the automatic protection of such systems. The valve, while adaptable for many different installations, may be used for the purpose of stopping the flow of inflammable gases or liquids from a piping system into the surrounding terrain or atmosphere if any part of the piping system should become damaged; especially where a hazardous condition is created from the flow of inflammable gases or liquids and where a fire is started or where an explosive mixture is permitted to accumulate. A fire which had been ignited because of an inflammable fluid or gas flowing from the piping system, and caused by line damage, would be quickly and automatically extinguished when the line is protected by the valve forming the present invention. The valve may be used for all types of stationary installations, and also for marine service and in the construction of various motor equipped vehicles.

In long gas or oil transmission pipe lines, this improved valve may be installed at certain intervals for the purpose of eliminating accidental line drainage. In such lines, it is the present practice to use manually operated valves in which no automatic protection is afforded. A line break, from any cause, may produce drainage of fluid from the line for many miles in the transmission structure, such drainage continuing until workers are able to reach the manually operated valves to close them. The present valve line enables considerable savings to be obtained in cases of this kind.

While a preferred form of the invention has been set forth in some considerable detail, nevertheless, it will be understood that the invention is subject to certain variations or modifications without departing from the scope of the following claims. For instance, the valve rod 22 has been shown as extending through a packing gland provided in the casing extension 21. In certain types of smaller valves where pressures are not so critical, this packing gland may be omitted. Also, in larger type valves, an ordinary weighted lever may be used for flexing the diaphragm 33 upwardly rather than employing the coil spring 40. Therefore, the right is reserved to employ all such modifications that may be said to fall fairly within the scope of the appended claims.

We claim:

1. A shut-off valve comprising a casing, a divisional wall within said casing dividing the latter internally into fluid inlet and outlet chambers, there being an opening in said wall provided for fluid flow between said chambers, a flexible diaphragm mounted for limited movement within a diaphragm chamber formed in said casing above said opening, a valve member carried by said diaphragm adapted to seat by gravity on the upper side of said wall to close said opening against fluid flow, said diaphragm being perforated between said valve member and its outer edge, a second diaphragm chamber formed in said casing below said inlet and outlet chambers, a restricted passage leading from said outlet chamber to the upper part of said second diaphragm chamber, a second diaphragm mounted for limited movement in said second diaphragm chamber, a second valve member carried by said second diaphragm, means acting on said second diaphragm to normally position said second valve member in seating engagement with the under side of said wall to close said opening, a second passage leading from said inlet chamber to the upper part of said second diaphragm chamber, said second passage being of greater diameter throughout its length than said first passage, and a manually operated valve normally closing said second passage.

2. A shut-off valve comprising a casing, a divisional wall within said casing dividing the latter into fluid inlet and outlet chambers, there being an opening provided in said wall to admit of fluid flow between said chambers, said opening having upper and lower valve seats formed at the opposite ends thereof, a flexible diaphragm clamped in said casing above said wall, said diaphragm having an opening therethrough to effect equalization of fluid pressure on its opposite surfaces, a gravity biased valve member carried by said diaphragm for engagement with the upper of said valve seats, a second diaphragm clamped in said casing below said chambers, a valve rod guided for sliding movement in said casing and having its lower end secured to the second of said diaphragms, a second valve member carried by the upper end of said valve rod and adapted for seating engagement with the lower of said valve seats, a coil spring acting on said second diaphragm to normally urge the second valve member into seating engagement with the lower of said valve seats, passage means communicating with said outlet chamber for applying fluid pressure obtained from the fluid outlet side of said valve to said second diaphragm, and a second passage means larger in diameter than said first passage means extending from the inlet chamber to the area of the valve casing in which said second diaphragm is positioned, said second passage means being provided with a normally closed manually actuated valve.

WILLIAM LEWIS LYON.
MILTON E. LAKE.